(12) United States Patent
Li et al.

(10) Patent No.: US 11,418,999 B2
(45) Date of Patent: Aug. 16, 2022

(54) BUFFER STATUS REPORT FOR HIGH PRIORITY TRANSMISSION

(71) Applicant: Apple Inc., Cupertino, CA (US)

(72) Inventors: Guoqing Li, Campbell, CA (US); Christiaan A. Hartman, San Jose, CA (US); Oren Shani, Saratoga, CA (US); Matthew L. Semersky, San Jose, CA (US); Joonsuk Kim, Saratoga, CA (US); Jarkko Kneckt, Campbell, CA (US); Ashok Ranganath, Cupertino, CA (US); Yong Liu, Campbell, CA (US); Su Khiong Yong, Palo Alto, CA (US)

(73) Assignee: Apple Inc.

( * ) Notice: Subject to any disclaimer, the term of this patent is extended or adjusted under 35 U.S.C. 154(b) by 492 days.

(21) Appl. No.: 15/428,959

(22) Filed: Feb. 9, 2017

(65) Prior Publication Data
US 2017/0230860 A1    Aug. 10, 2017

Related U.S. Application Data

(60) Provisional application No. 62/293,737, filed on Feb. 10, 2016.

(51) Int. Cl.
*H04W 28/02* (2009.01)
*H04W 84/12* (2009.01)

(52) U.S. Cl.
CPC ........ *H04W 28/0278* (2013.01); *H04W 84/12* (2013.01)

(58) Field of Classification Search
CPC .................... H04W 28/0278; H04W 84/12
See application file for complete search history.

(56) References Cited

U.S. PATENT DOCUMENTS

2016/0323426 A1*  11/2016  Hedayat ............ H04W 28/0268
2017/0311310 A1*  10/2017  Ryu .................. H04W 72/0413

OTHER PUBLICATIONS

Stacey, Robert; IEEE P802.11, Wireless LANs, Specification Framework for TGax; doc.: IEEE 802.11-15/0132r8; Sep. 22, 2015; 22 pgs.

* cited by examiner

*Primary Examiner* — Thai Nguyen
(74) *Attorney, Agent, or Firm* — Dickinson Wright RLLP

(57) ABSTRACT

A wireless local area network (WLAN) station (STA) reports, with a medium access control (MAC) frame, a buffer status of an urgent traffic identifier (TID) to a second STA. In some embodiments, the second STA is also an access point (AP). The delay in reporting is reduced by providing a buffer status report for the urgent TID in a data frame being transmitted to carry data for a current TID. The buffer status report, in some embodiments, provides the value of the urgent TID. In some embodiments, the buffer status report provides an indication of the amount of data in a buffer corresponding to the urgent TID. In some embodiments, the buffer status report is based on an aggregated measure of more than one buffer with data awaiting transmission. The transmission of the MAC frame, in some embodiments, is unsolicited.

20 Claims, 10 Drawing Sheets

BUFFER STATUS REPORT FOR HIGH PRIORITY TRANSMISSION

BENEFIT CLAIM

This application claims the benefit of U.S. Provisional Patent Application No. 62/293,737, entitled "BUFFER STATUS REPORT FOR HIGH PRIORITY TRANSMISSION," filed on Feb. 10, 2016, which is hereby incorporated by reference.

FIELD

The described embodiments relate to wireless communication, including providing data buffer status information in a data transmission frame that is associated with a data buffer having a traffic characteristic that is different than a traffic characteristic of the data transmission frame.

BACKGROUND

A wireless local area network (WLAN) often includes an access point (AP) and a WLAN station (STA). The Institute of Electrical and Electronics Engineers (IEEE) has defined a standard for WLAN medium access control (MAC) and physical (PHY) layers. A recent version of this standard is "Part 11: Wireless LAN Medium Access Control (MAC) and Physical Layer (PHY) Specifications," IEEE Std 802.11™-2012, Mar. 29, 2012, (2,793 pages) (hereinafter "IEEE 802.11"). A STA is an addressable unit in the IEEE 802.11 standard.

An AP is a physical or a virtual device that supports communication between associated STAs and another network, such as the Internet. This communication is via a wireless medium (WM). A STA may include a station management entity (SME), a MAC layer management entity (MLME) and a physical layer management entity (PLME). The layers and devices can communicate with each other with standardized primitives defined at service access points (SAPs). Further layer details are provided below.

A network referred to as a basic service set (BSS) is the basic building block of an IEEE 802.11 WLAN. Two STAs that belong to a BSS are able to communicate directly. An AP is any entity that has STA functionality and enables access to an architectural component referred to as the distribution system (DS) in the IEEE 802.11 standard. By means of an AP, a given STA can communicate with entities outside of a coverage area of a BSS to which it belongs.

A STA can buffer data before transmission. This data is typically referred to as "traffic." In general, there can be more than one kind of traffic, and therefore, more than one buffer in a STA. In some instances, these buffers may be referred to as application buffers. Additionally, there may be different urgencies or delay-tolerances (which are sometimes associated with "quality of service" or "QoS") associated with the different buffers. These QoS requirements usually need to be satisfied.

The IEEE 802.11 standard also defines various PHY services. More than one PHY is often defined within the standard. Each PHY can include a physical layer convergence procedure (PLCP) layer and a physical medium dependent (PMD) function. The PMD defines methods of transmitting and receiving data through a WM between two or more STAs.

One PHY in IEEE 802.11 is orthogonal frequency-division multiplexing (OFDM) using subcarriers modulated with various levels of quadrature amplitude modulation (QAM) and binary phase shift keying (BPSK). A multiple access technique known as orthogonal frequency division multiple access (OFDMA) is planned based on an amendment to IEEE 802.11. Certain aspects of OFDMA are described in the planned amendment to the IEEE 802.11 standard known as "IEEE 802.11ax." "Specification Framework for TGax, doc.: IEEE 802.11-15/0132r8," Sep. 22, 2015 (hereinafter "IEEE 802.11ax Framework"), is a standards framework document that outlines planned topic areas for the development of IEEE 802.11ax. Several features of IEEE 802.11ax are devoted to high efficiency (HE) and so some MAC definitions in IEEE 802.11ax have a suffix of "HE."

SUMMARY

Representative embodiments set forth herein disclose various systems and techniques for reducing a delay in a STA reporting the buffer status of an urgent TID to an AP. The delay in reporting is reduced by providing a buffer status report for the urgent TID in the HE Control field of a data frame being transmitted to carry data for a current TID. The buffer status report, in some embodiments, provides the value of the urgent TID. In some embodiments, the buffer status report provides an indication of the amount of data in the buffer corresponding to the urgent TID. The indication of the amount of data can be a scaled number of octets. The indication of the amount of data can be a one bit value indicating a comparison of the amount of data in the buffer with a threshold amount of data. The buffer status report may indicate two or more TIDs, each different than the current TID. Embodiments disclosed herein also can be employed for informing an AP about TIDs of low priority traffic. The buffer status report providing information about the urgent TID can be in response to a trigger frame or the buffer status report can be sent independently of a trigger frame. The buffer status report can be addressed to an AP. The buffer status report can also be addressed to another STA within a BSS of the transmitting STA, without making use of an AP.

This Summary is provided merely for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Aspects of Wireless Local Area Networks

Figure 1:
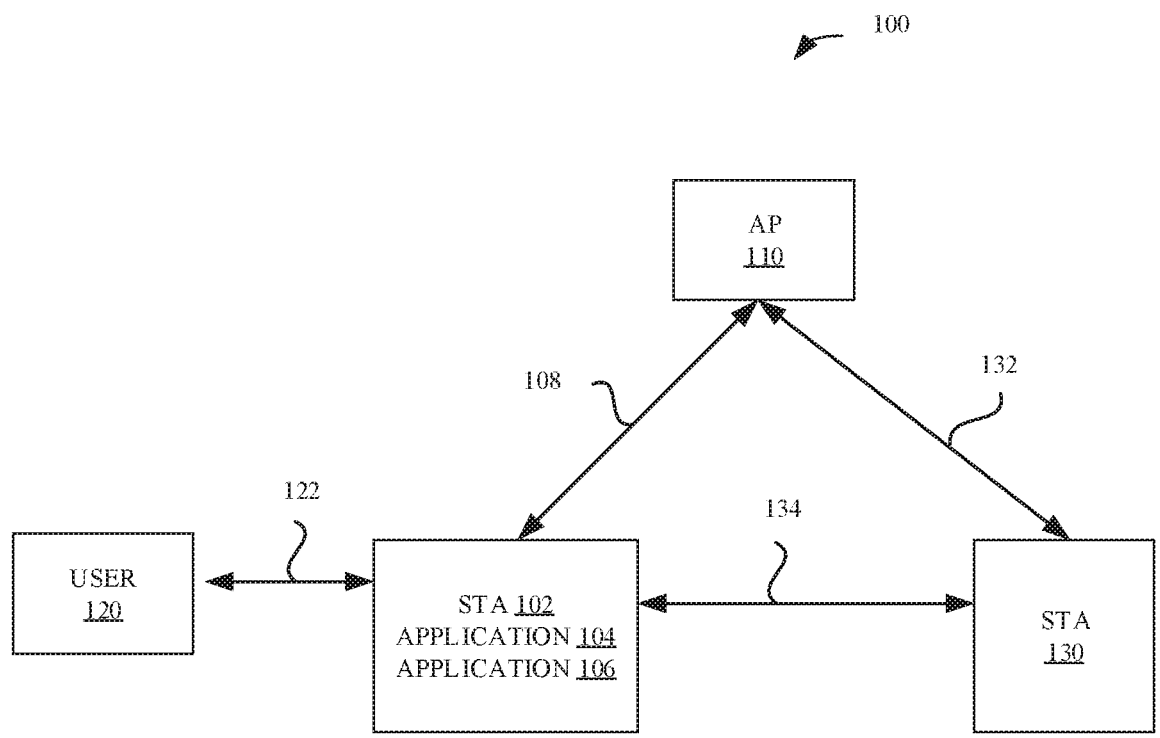
FIG. 1 illustrates an example system including an AP and two STAs, according to some embodiments.

WLAN communication of STAs and APs has been introduced above. The overall functions of a STA or an AP can be expressed in terms of a layer model. Single units of data and/or control information within a layer are called protocol data units (PDUs). For example, a PDU at the physical layer convergence procedure (PLCP) layer is referred to as a PPDU.

The MAC layer in the IEEE 802.11 standard supports a QoS facility. In particular, the QoS facility supports various priority values. A priority value is referred to as a user priority (UP). For example, a STA may inform an AP of QoS information for a given traffic flow using a QoS control field. The QoS control field may include a traffic identifier (TID) and buffer information about data corresponding to the TID. The terms "traffic identifier" and "TID" are used interchangeably herein. Information flow within a STA between layers may be via SAPs. Moreover, the units that flow across a SAP are called MAC service data units (MSDUs), and a TID is a label that distinguishes MSDUs and is used to support QoS by MAC entities. Furthermore, a TID value may specify a traffic category (TC) or a traffic stream (TS). A TC may indicate a distinct user priority (UP) among MSDUs for delivery over a given link, and a TS may be a set of MSDUs to be delivered subject to QoS parameter values provided to the MAC in a particular traffic specification (TSPEC). More details on the QoS facility of the MAC layer are provided in the IEEE 802.11 standard.

Enhanced distributed channel access (EDCA) is a prioritized carrier sense multiple access with collision avoidance (CSMA/CA) access scheme used by STAs and APs supporting QoS. A transmission opportunity (TXOP) in EDCA is defined by rules which permit access to the WM. There is typically a delay or latency between initiation of EDCA by a STA to send data and successful transmission of that data because the WM is an unscheduled shared medium prone to collisions when accessed via EDCA.

The MAC layer in a STA may construct MAC frames. A MAC frame may include a MAC header, a variable length frame body, and a cyclic-redundancy check field called the "FCS." The MAC header may include frame control, duration, and address information. The MAC header can also include QoS control information and HT control fields (where HT stands for high throughput). The QoS control information, if present, may be in a subfield known as the QoS Control field. For example, the QoS control field may be a 16-bit field that provides a TID that identifies the TC or TS to which the frame belongs. The QoS control field can also include information related to the data buffer associated with the TID, such as a TXOP duration requested value or a queue size value. The IEEE 802.11ax Framework specifies that the IEEE 802.11ax specification will have a variation of the HT Control field, which is called the HE control field.

The IEEE 802.11 standard also provides a collection of features called services. Two example services that can be provided by an IEEE 802.11 WLAN are MSDU delivery and QoS traffic scheduling. QoS traffic scheduling can be contention-based or by controlled channel access. At each TXOP, an IEEE 802.11 STA may select a frame for transmission based on a requested UP and/or parameter values in a TSPEC for an MSDU.

The QoS control field can be sent by a STA to an AP to indicate buffered traffic associated with a given TID awaiting transmission. The receiving AP can use the received QoS control field to schedule controlled channel access, i.e., an uplink transmission opportunity for the STA to send a portion of the data associated with the TID indicated in the QoS control field received by the AP.

According to the IEEE 802.11ax Framework, resource allocation information for one or more addressed STAs can be sent by an AP in a control frame called a trigger frame. The trigger frame may convey or carry sufficient information to identify the STAs transmitting uplink (UL) multiuser (MU) PPDUs and the trigger frame may allocate resources for the addressed STAs to transmit those UL MU PPDUs at a certain time interval subsequent to the trigger frame. The transmission from all the STAs indicated in the UL MU PPDU may end at a time indicated in the trigger frame.

An AP can poll STAs according to the IEEE 802.11ax Framework to determine the buffer status of the respective STAs. Based on the results of the poll, the AP can schedule resources for the STAs. A given STA can respond to the poll with a QoS data frame or with a QoS null data frame. The scheduled STAs then transmit some of the data from their buffers using the scheduled resources. Having accurate buffer status reports at the AP is important to permit the STAs to transmit data from buffers in a timely manner.

The QoS control header in the QoS data frame or QoS null data frame contains a TID value which corresponds to the data in the buffer reported. The TID maps to different traffic categories. In other words, the TID value indicates how important the data is, or how rapidly the data must be communicated before, in some sense, it becomes stale. For example, conversational voice traffic generally has a priority higher than streaming video traffic. Queue size is the total amount of traffic for the corresponding TID. The value of the TID is mapped, for example, from an application at the user level based on a user priority (UP). One TID value may map to an access category equal to voice in the MAC layer, for example.

A STA with traffic waiting in a buffer can wait for a trigger frame and then may transmit a portion of the buffered traffic after receiving a trigger frame addressing the STA. Alternatively, such a STA can contend for the WM using EDCA, which takes time. An AP can poll a STA to determine if the STA has traffic awaiting transmission. The polling can be done using a trigger frame. As mentioned above, a STA can report buffer status using a QoS data frame or a QoS null frame. Note that a frame that carries no data payload (no traffic) is referred to as a null frame, and a frame that includes the QoS control field and no data payload is referred to as a QoS null frame or QoS null data frame. No data payload corresponds to a frame body of zero length.

A STA can transmit a given data frame within a BSS or to a non-local entity via an AP, where the AP provides the DS architectural component. The given data frame does not need to be in response to a trigger frame from the AP.

When a STA has a new traffic demand, there may be some delay in informing the AP of the need for a resource allocation. This delay is sometimes referred to as 'latency.' The latency occurs because i) the STA is either passive, awaiting a poll from the AP, or ii) the STA contends for the WM and the transmission from the STA may collide with other STA transmissions present in the WM. This latency can occur for a waiting TID even though the STA is actively draining a buffer using granted transmission resources for a first TID. This is because the STA may only report buffer status in a QoS data frame for the first TID (corresponding to the data payload in the QoS data frame). If an urgent TID develops that is different than the first TID, the STA may need to wait or contend for the WM in order to inform the AP of the urgent TID. This may occur even if the STA is currently allocated resources for sending data for the first TID.

Thus, a STA according to the IEEE 802.11ax Framework is limited concerning buffer status reports. A STA may only report buffer status for a given TID when the STA has a data portion scheduled to send with that particular TID. There is a problem here because a given STA sometimes has other traffic, either high priority or low priority, which the AP should know about so that the AP can schedule in an efficient manner resources for the STAs it serves.

Reducing a Delay

Reducing a delay in a STA reporting the buffer status of an urgent TID to an AP is addressed by representative embodiments set forth herein. In some embodiments, the delay in reporting is reduced by providing a buffer status report for the urgent TID in the HE Control field of a data frame being transmitted to carry data for a current TID. The buffer status report, in some embodiments, provides the value of the urgent TID. In some embodiments, the buffer status report provides an indication of the amount of data in a buffer corresponding to the urgent TID. The indication of the amount of data can be a scaled number indicating a number blocks of octets. The indication of the amount of data can be a one bit value indicating a comparison of an amount of data in the buffer with a threshold amount of data. The buffer status report may indicate two or more TIDs, each different than the current TID.

In other words, buffer status reporting is improved by embodiments described herein by, when sending data of a first TID in a MAC frame, also reporting buffer status of a second TID using a header field of the MAC frame. Thus, whenever a STA has a data portion to send, the STA can report the buffer status of any other TID in an exemplary embodiment. The technique disclosed herein has low delay, for example, compared to generating a QoS null data frame and reporting the buffer status that way.

In some embodiments, the buffer status information for the second TID is provided in the HE control header.

The overall aggregated status of all TIDs can be reported, in some embodiments, in the buffer status report. Urgency of the aggregated traffic is indicated, in some embodiments, with an urgency indication. If the urgency indication is set to 1, then, in some embodiments, there is a significant amount of data in the STA buffers which needs to be sent. A significant amount of data can be 10% or more of the total data in the buffers of the STA. Or, a significant amount can be determined as any data with a UP value indicating high priority, such as voice.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

System

FIG. 1 illustrates an exemplary system of a STA 102 providing queue buffer status information to an AP 110 along wireless communication path 108. STA 102 may host applications 104 and 106. STA 130 is also a member of the communication network 100 of FIG. 1 and communicates along communication paths 132 and 134. STA 102, in some embodiments, is associated with a human being, user 120. User 120 may interact with STA 102 using an interface or communication path indicated as 122 in FIG. 1.

Stack

Figure 2:
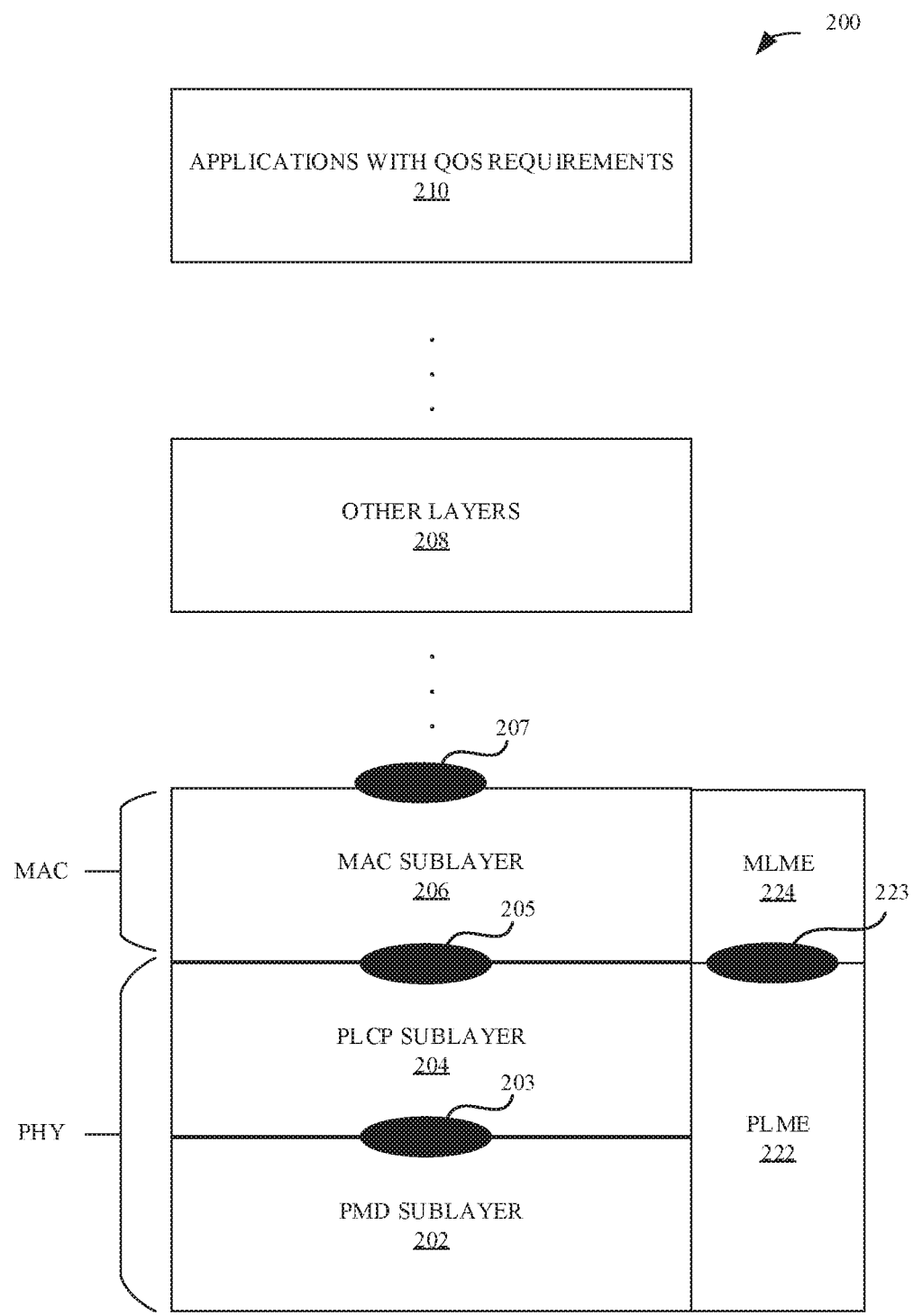
FIG. 2 illustrates exemplary details of a protocol stack of a STA, according to some embodiments.

FIG. 2 illustrates an exemplary protocol stack 200 of STA 102. Protocol stack 200 may include application layer 210. Protocol stack 200 may also include a PHY layer including sublayers PLCP sublayer 204 and PMD sublayer 202. PLCP sublayer 204 and PMD sublayer 202 may communicate with each other using SAP 203. Moreover, the PHY may be managed by PLME 222. Protocol stack 200 may include MAC sublayer 206, which may be managed by MLME 224. MAC sublayer 206 may communicate with a layer above using SAP 207 and with PLCP sublayer 204 using SAP 205. MLME 224 may communicate with PLME 222 using SAP 223. Between application layer 210 and MAC sublayer 206 are, generally, other layers 208.

Buffers

Figure 3:
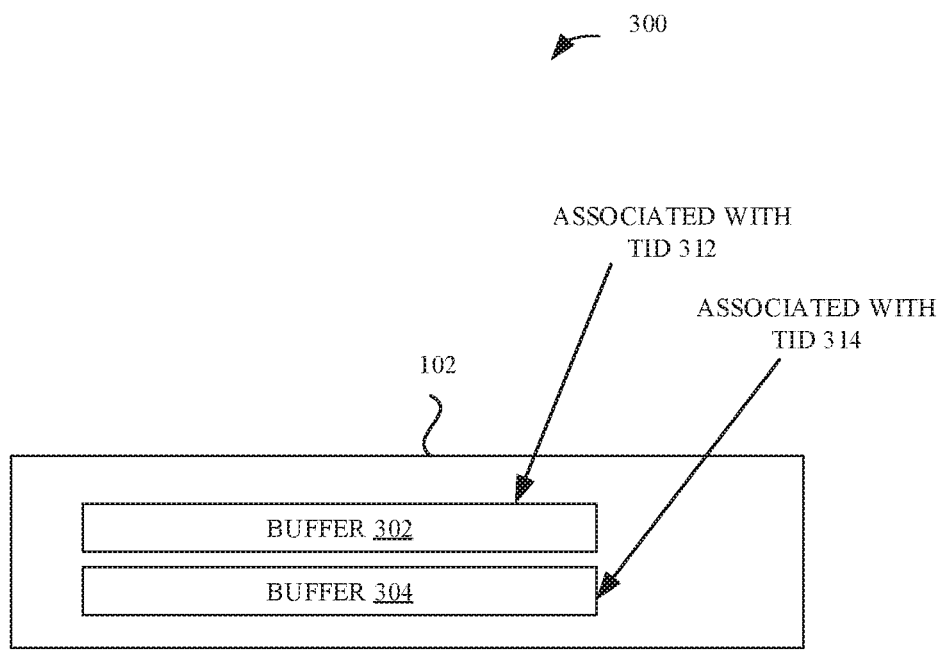
FIG. 3 illustrates exemplary data buffers of a STA, according to some embodiments.

FIG. 3 illustrates exemplary STA 102 including buffer 302 and buffer 304. At some point in time, buffer 302 is associated with a traffic identifier 312 and buffer 304 is associated with a traffic identifier 314. In general, these traffic identifiers are different. In some embodiments, buffer 302 includes data associated with application 104 and buffer 304 includes data associated with application 106.

In some embodiments, STA 102 is communicating information of a current traffic identifier with AP 110, for example, information from buffer 302 associated with application 104 and traffic identifier 312. If STA 102 has other high priority traffic in buffer 304 associated with application 106 and traffic identifier 314, the existence of this high priority traffic can be signaled to AP 110 using the MAC frame of FIG. 4.

MAC Frame

Figure 4:
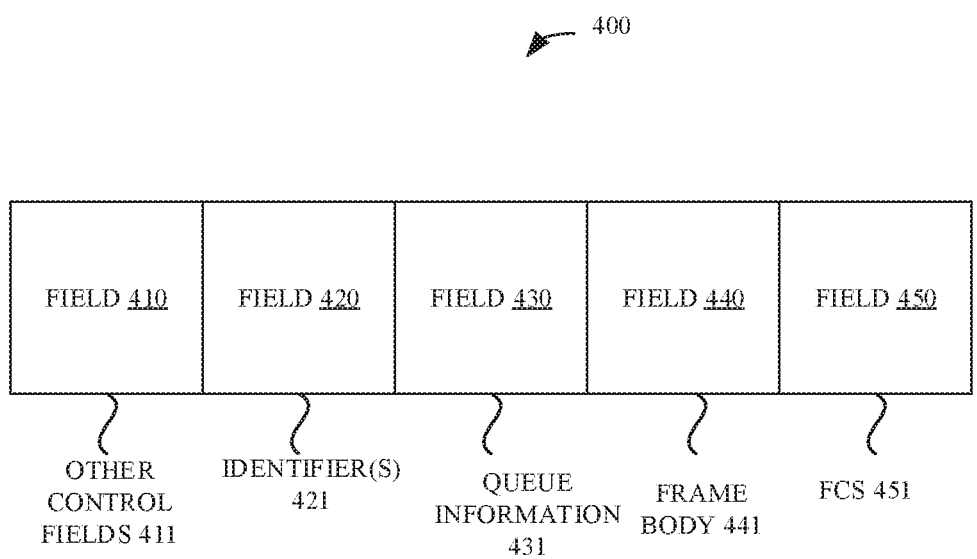
FIG. 4 illustrates an exemplary MAC data frame, according to some embodiments.

FIG. 4 illustrates exemplary embodiments of a MAC frame 400 which can be used to signal high priority traffic. The exemplary MAC frame 400 includes fields 410, 420, 430, 440 and 450. Field 410 can include other control fields 411 distinct from QoS information of fields 420 and 430. Field 420 can include a traffic identifier 421, which can take on the value of TID 314 (see FIG. 3). Field 430, in some embodiments, includes queue status information 431 associated with the traffic identifier 421, which can indicate the queue status of buffer 304. Field 440 can include frame body 441 and frame body 441 can be associated with a traffic identifier different from traffic identifier 421. For example, frame body 441 can carry traffic from buffer 302 associated with traffic identifier 312. Field 450 can include a checksum, represented in FIG. 4 as FCS 451.

Thus, when STA 102 is communicating information associated with TID 312 and application 104, for example, and application 106 suddenly demands high priority attention associated with TID 314, STA 102 can signal the status of buffer 304 (and thus the status of TID 314 and application 106) to AP 110 within a MAC frame carrying data for application 104.

Buffer Status Report Formats

Figure 5A:
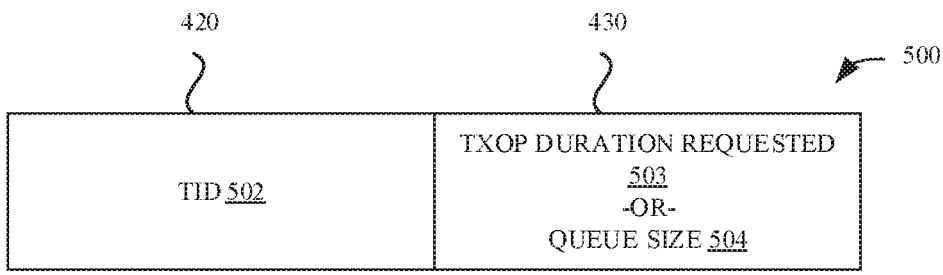
FIGS. 5A-5E illustrate additional and alternative traffic identifiers and queue status information, according to some embodiments.

Exemplary formats for STA 102 to signal the buffer status of high priority TID within a MAC frame carrying payload data for another TID are shown in FIGS. 5A, 5B, 5C, 5D, and 5E. FIG. 5A illustrates that field 420 can include TID 502. This TID 502 value can be represented with, for example, 4 bits. Field 430 carries queue information associated with TID 502. TID 502, in some embodiments, carries the value of TID 312. The field 430 queue information corresponds, for example, to buffer 302. The field 430 queue information, in some embodiments, includes or otherwise represents a requested TXOP duration 503 and can be represented with 8 bits. Alternatively, the field 430 queue information, in some embodiments, includes or otherwise represents a queue size 504 and may be represented with 8 bits. The queue size can be in units of 256 octets. In some embodiments, the two fields of FIG. 5A are represented with a total of 8 bits plus 1 bit for a total of 9 bits. STA 102, in general, will have more than two applications with data to send. STA 102 can choose which application to indicate with TID 502 based the traffic identifier associated with the most critical latency requirement. That is, the traffic identifier associated with the more stringent latency requirement will be identified by the value of TID 502 in field 420.

Figure 5B:
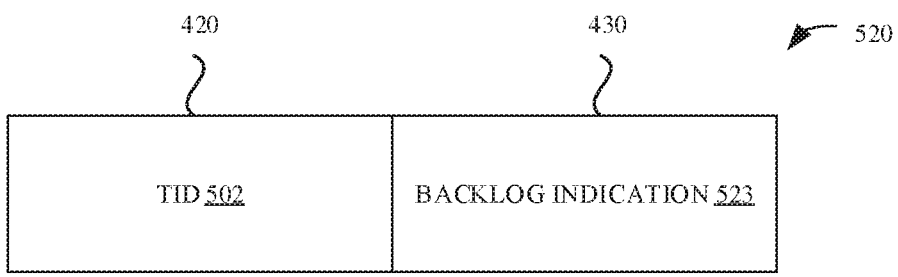
Figure 5C:
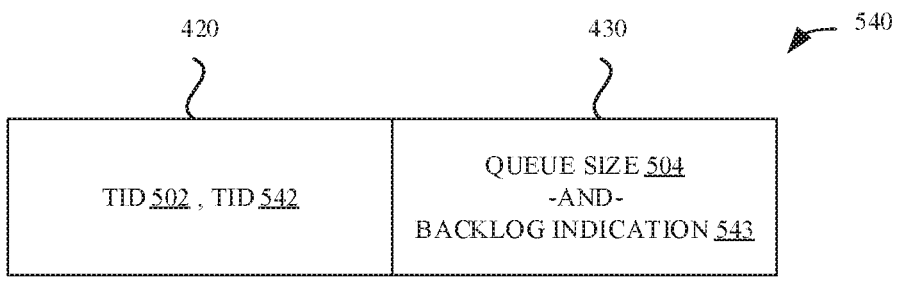

For example, if a user priority (UP) associated with buffer 304 and TID 314 is higher than a third UP associated with a third buffer (not shown in FIG. 3) and a third TID, then TID 502 can take on the value of TID 314 and TID 542 can take on the value of the third TID (see FIG. 5C). Queue size 504 will then represent the amount of data in buffer 304 and backlog indication 543 will indicate the result of comparing the amount of data in the third buffer with a buffer size threshold.

FIG. 5B provides an alternative exemplary buffer status reporting format. Field 420 carries TID 502, which can correspond to a high priority application demand as in FIG. 5A. Field 430 can consist of backlog indication 523. The backlog indication 523 can be computed by comparing the amount of data in buffer 304 with a backlog threshold. If the amount of data exceeds the backlog threshold, backlog indication 523, in some embodiments, is set to the value binary "1." If the amount of data does not exceed the backlog threshold, backlog indication 523 is set to the value binary "0." The backlog threshold, in some embodiments, can have a value of, for example, 10, 100, or 1000 256-octet units.

The two fields of FIG. 5B can then be represented with a total of 4 bits plus 1 bit for a total of 5 bits. As in FIG. 5A, the traffic identifier associated with the more stringent latency requirement will be identified in field 420 of FIG. 5B.

FIG. 5C illustrates an alternative exemplary buffer status report featuring two traffic identifiers. These identifiers, as in FIGS. 4, 5A, and 5B, are in addition to the first traffic identifier associated with the payload data in frame body 441. Field 420 in FIG. 5C, in some embodiments, can include 8 bits with 4 bits for TID 502 and 4 bits for TID 542. Field 430, in some embodiments, includes a queue size of, for example, 8 bits associated with TID 502 and a 1 bit backlog indication 543 associated with TID 542. The backlog indication, in some embodiments, is more than one bit. Buffer status report 540 can occupies, in some embodiments, 4 bits plus 4 bits plus 8 bits plus 1 bit or a total of 17 bits. The buffer status report 540 of FIG. 5C, in some embodiments, carries buffer status for the most urgent or highest priority traffic using TID 502 and queue size 504. Buffer status report 540 may also carry or include TID 542 and backlog indication 543 corresponding to a traffic demand less critical than that identified with the pair TID 502/queue size 504.

The backlog threshold, in some embodiments, provides sensitive timing information to the AP. For example, the backlog indication, in some embodiments, is used to indicate that a delivery of the frames associated with a given TID are delayed. The indication, in some embodiments, indicates that there is a predefined backlog time threshold duration of transmission time left before discard for a portion of data in a buffer (packets) corresponding to a TID reported in the buffer status report. The backlog time threshold duration, in some embodiments, can be, for example, 1, 10, 100, or 1000 milliseconds (ms). In some embodiments, setting the backlog indication to the value "1" indicates that the AP needs to assign transmission resources soon, or the STA will discard the packets associated with the TID reported in the buffer status report due to transmission delay. In some embodiments, the backlog indication is more than one bit and represents a quantization of the amount of time left for the portion of data before the STA will discard the data. For example, the backlog indication can be, in some embodiments, two, three or four bits of time-until-discard information.

Figure 5D:
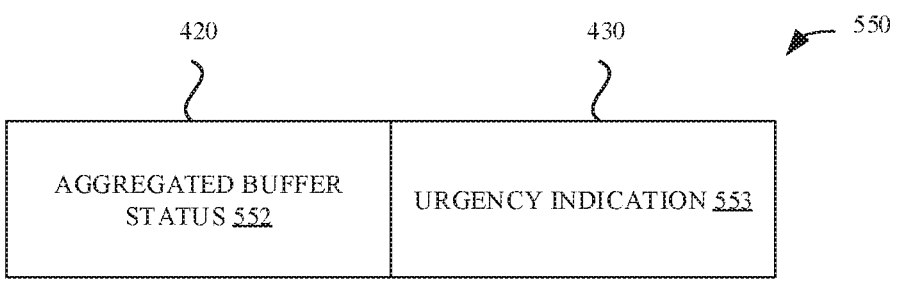

FIG. 5D illustrates an alternative exemplary buffer status report 550 featuring an aggregated buffer status 552. This aggregated buffer status 552 is an indication of a total amount of data in a STA that is awaiting transmission. In some embodiments, the buffer status report can include an urgency indication 553 that indicates a significant amount of the aggregated data has a high priority. A significant amount can be measured in several ways. For example, a significant amount can be i) more than 10% of the data awaiting transmission, ii) any data with a high UP value, such as voice, or iii) more than an absolute threshold amount, such as, for example, 10 portions of 256 octets each. An aggregate is a collection, sum, or an accumulation. In some embodiments, the aggregated buffer status sums together queue sizes or measures of data size in one or more buffers. In some embodiments, if a first buffer holds ten 256-octet units awaiting transmission, and a second buffer holds twenty 256-octet units, the aggregated indication is thirty 256-octet units. A third non-empty buffer, in some embodiments, is present in the STA. The third buffer can be brought into the sum or can be left out of the sum. The aggregated buffer status can also be a threshold indication. For example, it can be a one bit value with value "1" indicating that a summed amount of data waiting is more than a threshold value. A value of "0", in some embodiments, indicates that a summed amount of data waiting is less than the threshold value. The threshold value can be, for example, 10, 100, or 1000 units. In some embodiments, one unit is 256 octets.

Figure 5E:
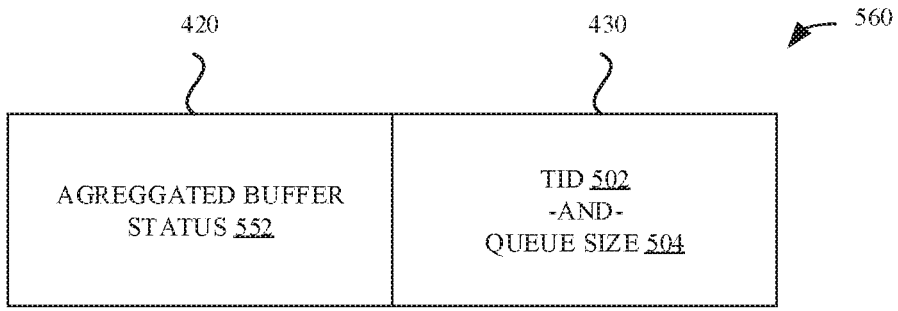

FIG. 5E illustrates an alternative exemplary buffer status report 560 featuring the aggregated buffer status 552, a TID value 502 and a queue size 504. Buffer status report 560 communicates to the AP a total amount of data in the reporting STA waiting for transmission (i.e. aggregated buffer status 552) and particular buffer status information for TID 502, for example, a queue size 504 associated with TID 502.

Regarding granularity of the buffer status reports illustrated in FIG. 4 and FIGS. 5A-5E, several approaches are provided by embodiments disclosed herein. Queue size value 504 and aggregated buffer status value 552, in some embodiments, indicate a number of 256 octet units. The size of a unit, in some embodiments, is smaller than 256 octets, for example the unit can have a size of 128 octets. Alternatively, in some embodiments, the size of a unit is larger than 256 octets. For example the unit can have a size of 512 octets. The HE control header can include (not shown) an indication of granularity. For example, a scale indication, in some embodiments, in the HE control header indicates that the queue size 504 is interpreted as multiplied by the scale indication. In some embodiments, the scale indication indicates that the reporting unit of the buffer status report is multiplied by the scale indication.

Other buffer status reports are also disclosed herein, for example, field 420 can include three traffic identifier values with corresponding field size contributions of (three times 4 bits) plus a queue size (8 bits) plus two 1 bit backlog indicators. Such a format occupies a total of 12 bits plus 8 bits plus 1 bit plus 1 bit for a total of 22 bits.

Scheduling Technique

Figure 6:
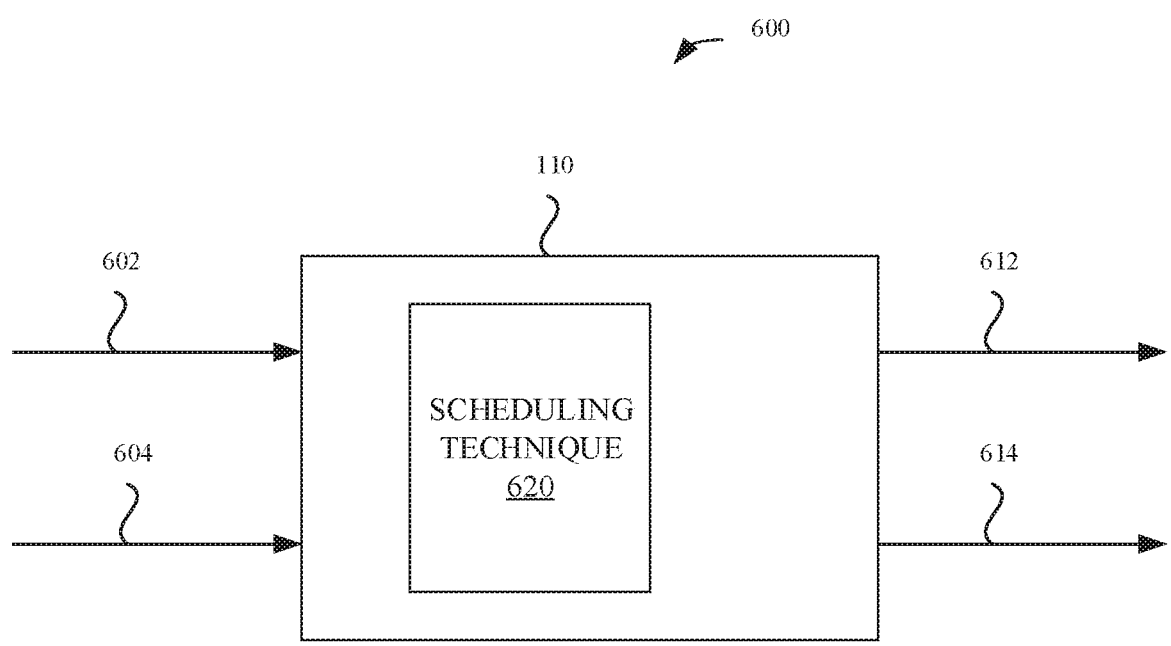
FIG. 6 illustrates exemplary inputs and outputs of an AP uplink scheduling technique, according to some embodiments.

AP 110, in some embodiments, receives a buffer status report 602 from STA 102 and a buffer status report 604 from STA 130, as illustrated in FIG. 6. AP 110 then, in some embodiments, performs a scheduling technique 620 based on its knowledge of the various buffers in the various STAs and their traffic identifiers. AP 110, in some embodiments, then allocates resources (transmission opportunities) among the STAs in network 100. This allocation of resources can be done with one or more trigger frames (shown schematically as 612 and 614 in FIG. 6).

Message Flow

Figure 7:
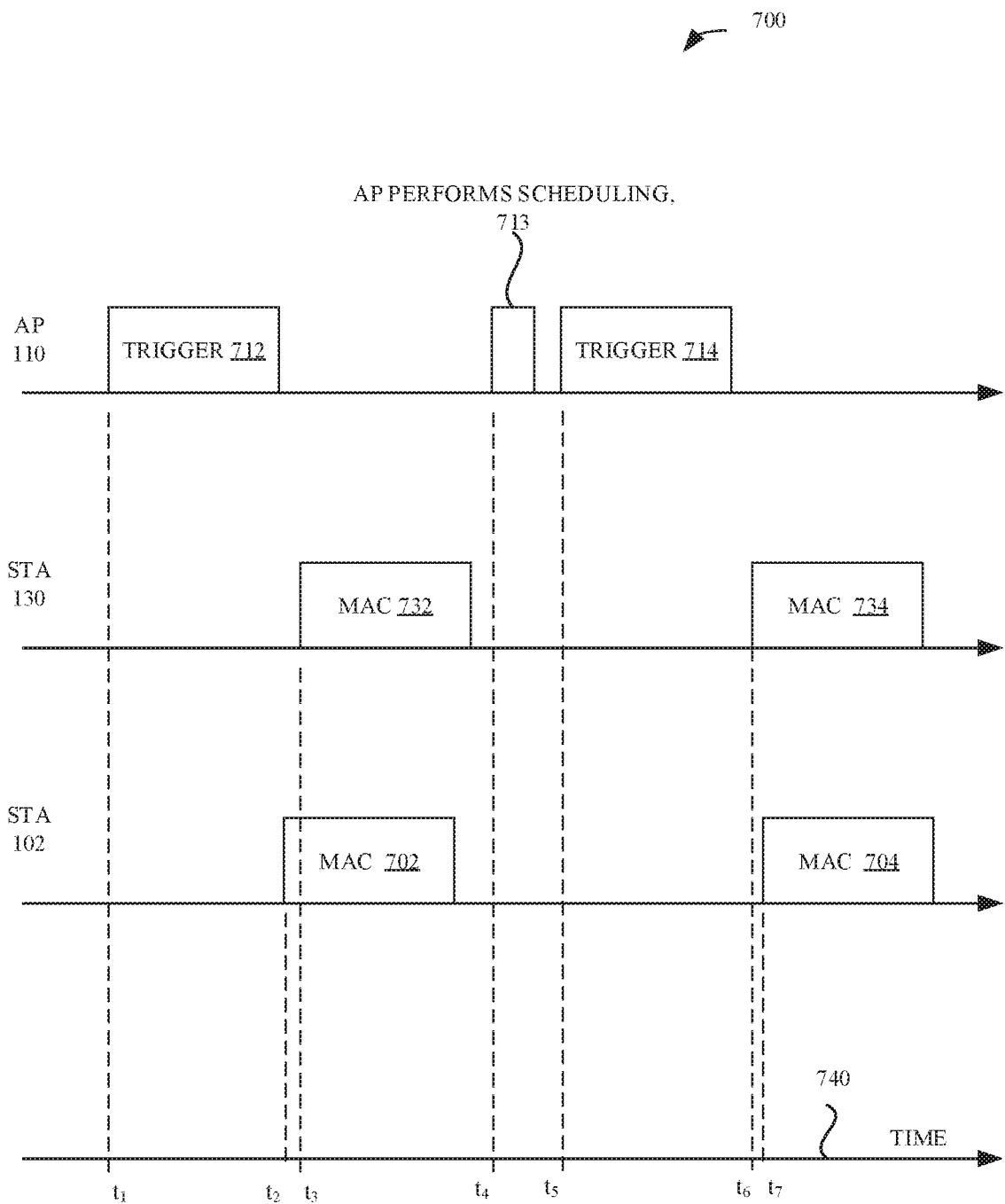
FIG. 7 illustrates exemplary WLAN signaling along a time axis, according to some embodiments.

FIG. 7 illustrates an exemplary time sequence of AP 110 sending a trigger frame 712 at a time $t_1$. Concurrent timelines are shown for each of AP 110, STA 130, and STA 102. Also a time axis 740 is shown with specific moments in time marked. STAs 130 and 102 respond with MAC frame transmissions 732 and 702 at nominally the same time (times $t_2$ and $t_3$ are nominally the same in FIG. 7). In some embodiments, MAC frame 702 carries data from buffer 302 associated with application 104 and TID 312. In the same MAC frame 702, fields 420 and 430 carry a buffer status report for buffer 304 associated with application 106 and TID 314. The information in fields 420 and 430, in some embodiments, is formatted as shown in FIG. 5A, 5B, 5C, 5D, or 5E. Other formats can also be used, for example information for three TID values can be provided in field 420 as described above. At time $t_4$, AP 110, in some embodiments, performs a scheduling technique 620 as indicated by activity 713 on the AP 110 timeline in FIG. 7. AP 110 then sends, in some embodiments, trigger frame 714 that carries resource assignments such as those indicated as 612 and 614 in FIG. 6. STA 102 then responds with MAC frame 704 at time $t_7$. The frame body of MAC frame 704, in some embodiments, carries payload data from buffer 304 associated with traffic identifier 314 and application 106. Thus, STA 102 is able to signal an urgent need for resources with MAC frame 702 at time $t_2$ and follow-up with a scheduled transmission (without contention) at time $t_7$. Because STA 102 is able to promptly provide for transmission of the urgent data in buffer 304, STA 102 can enter a sleep mode quickly. In sleep mode certain radio frequency circuits are turned off. In sleep mode, then, less power is consumed. This allows a battery of STA 102 to remain charged for a longer period of time and a better user experience for user 120.

STA 102, in some embodiments, transmits a data frame independently of a trigger frame, where the data frame includes buffer status report 604. In other words, STA 102, in some embodiments, sends MAC frame 702 independently of any trigger frame from AP 110. MAC frame 702 carrying a buffer status report for buffer 304 associated with application 106 and TID 314 and data payload for TID 312 can be sent at any time. Thus MAC frame 702 can be sent within a BSS to STA 130, for example. Or MAC frame 702 can be sent to AP 110, but independently of a trigger frame. That is, MAC frame 702 reporting buffer status for TID 314 while carrying data for TID 312 can be sent without solicitation by AP 110.

Figure 8A:
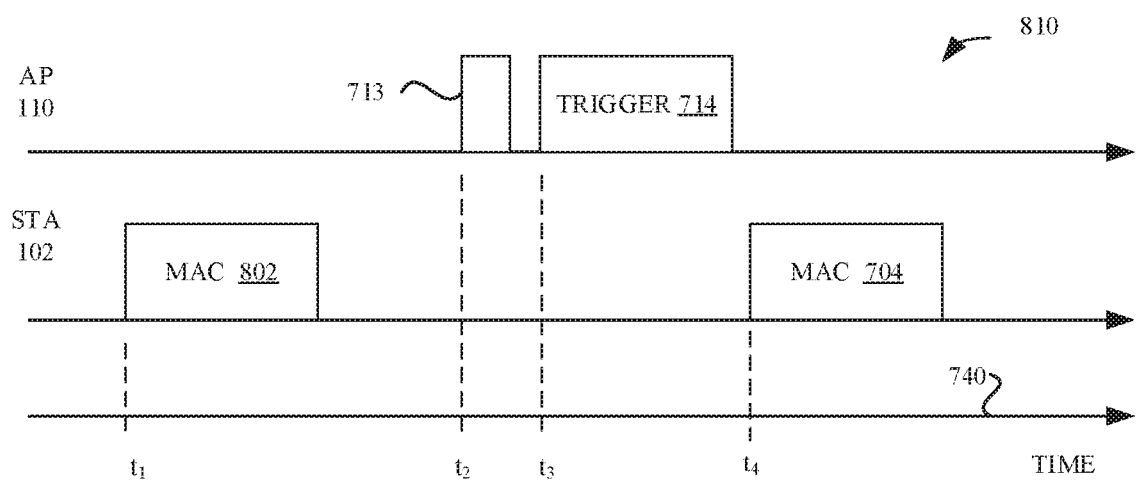
FIGS. 8A-8C illustrate additional exemplary WLAN signaling along a time axis, according to some embodiments.
Figure 8B:
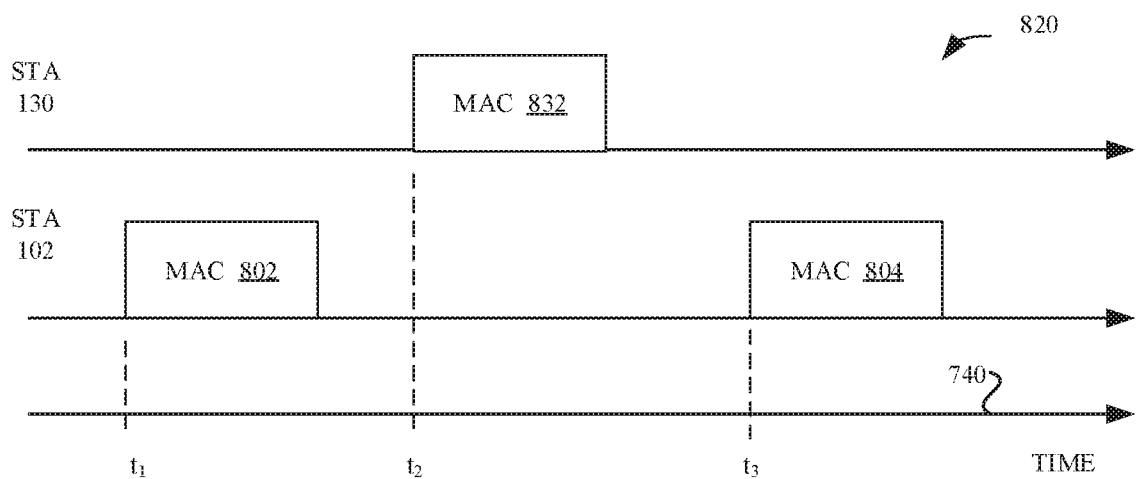
Figure 8C:
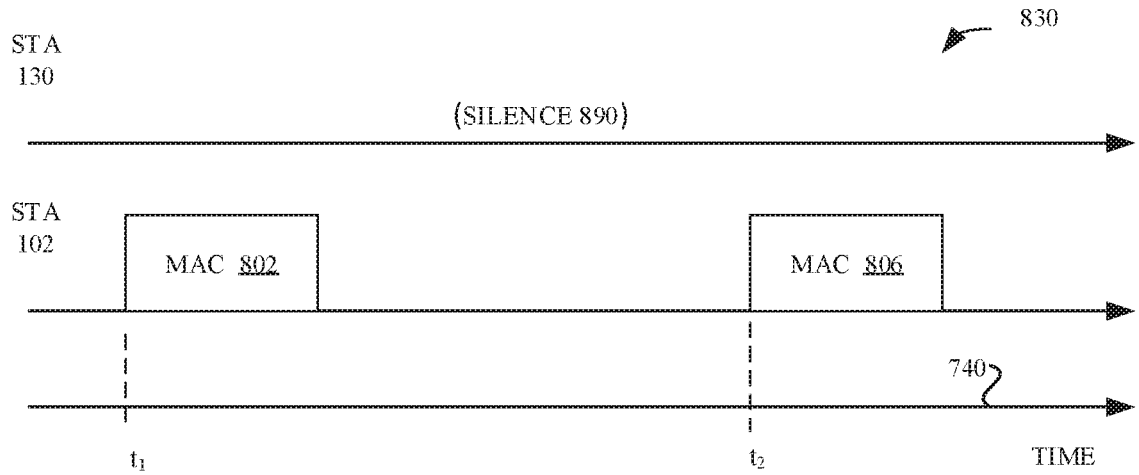

FIGS. 8A-8C illustrate, in some embodiments, transmission at $t_1$ by STA 102 of a MAC frame 802 including a buffer status report describing, for example, buffer 304 associated with application 106 and TID 314. In some embodiments, MAC frame 802 of FIGS. 8A-8C carries payload data in the frame body of MAC frame 802 where the payload data from buffer 302 is associated with application 104 and TID 312. In FIG. 8A, MAC frame 802 is transmitted to AP 110. AP 110, at $t_2$, performs a scheduling technique 713 that may be as described with regard to 620 of FIG. 6. Based on the scheduling technique, AP 110 sends trigger frame 714 at $t_3$. Trigger 714 solicits transmission by STA 102 of data associated with TID 314. STA 102 responds with MAC frame 704 carrying payload data associated with TID 314.

FIGS. 8B and 8C illustrate peer-to-peer communication of STAs 102 and 130 using MAC frame 802 including, for example, a buffer status report for TID 314 while carrying data for TID 312. FIGS. 8B and 8C illustrate MAC frame 802 transmitted by STA 102 at time at $t_1$. STA 130 receives the payload data associated with TID 312 and the buffer status report associated with TID 314.

In the example of FIG. 8B, STA 130 responds to MAC frame 802 with MAC frame 832, which may or may not carry payload data. MAC frame 832 carries an indication that STA 102 should provide payload data associated with TID 314. STA 102 responds to MAC frame 832 at $t_3$ with MAC frame 804. The frame body of MAC frame 804 can carry, for example, payload data from buffer 304 associated with application 106 and TID 314.

In the example of FIG. 8C, STA 130 does not respond to MAC frame 802 (indicated in FIG. 8C as "silence 890"). In some embodiments, for a group of TIDs, a default condition is no response from the receiving peer-to-peer STA. STA 102, in response to silence 890, sends at $t_2$ MAC frame 806. The frame body of MAC frame 806 can carry, for example, payload data from buffer 304 associated with application 106 and TID 314.

As illustrated in FIGS. 8A and 8B, provided herein is a method for communicating a buffer status report by a first STA comprising a first buffer and one or more other buffers. In the method, the first STA forms a frame body of a MAC frame based on a first data portion from the first buffer, wherein the first data portion is associated with a first traffic identifier. The first STA then forms a MAC header of the MAC frame, wherein the MAC header comprises a buffer status report for the first buffer and the one or more other buffers. The first STA then transmits the MAC frame to a second STA. In the method, the first STA can also communicate, prior to forming the frame body, as a member of a BSS with the second STA. In some embodiments, the second STA is an AP. After sending the MAC frame the first STA may receive a trigger frame from the second STA. In response to the trigger frame, the first STA sends data from one of the one or more other buffers.

Logic

Figure 9:
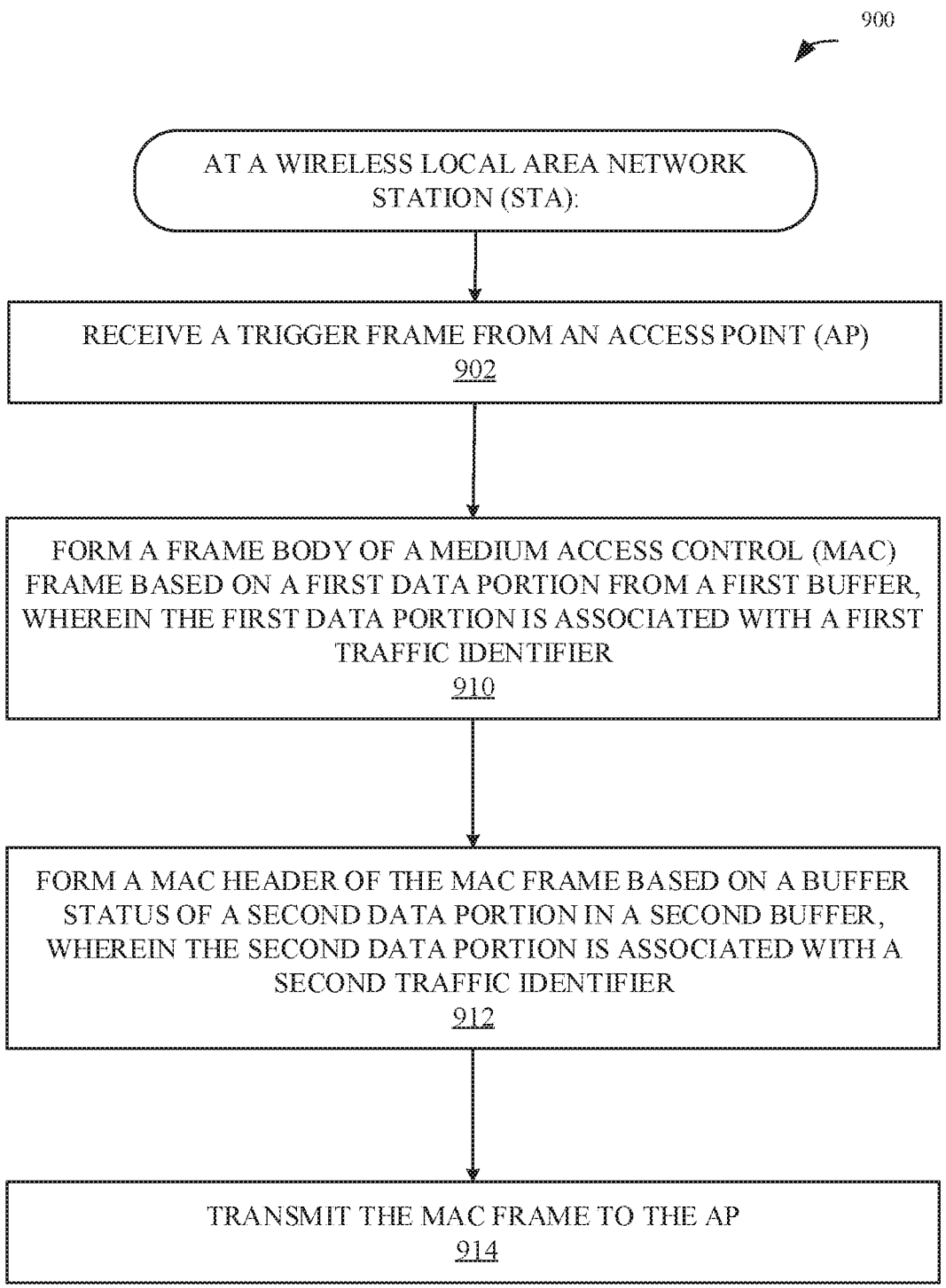
FIG. 9 illustrates exemplary logic for communicating queue status by forming a MAC frame at a STA and transmitting it to an AP, according to some embodiments.

FIG. 9 illustrates exemplary logic for reporting urgent buffer status, in some embodiments. AT 902, a STA receives a trigger frame from an AP. At 910, the STA forms a frame body of a MAC frame based on a first data portion from a first buffer, where the first data portion is associated with a first TID. At 912, the STA forms a MAC header for the MAC frame based on a buffer status of a second data portion in a second buffer, where the second data portion is associated with a second, and different, TID. At 914, the STA transmits the formed MAC frame to the AP.

Representative Exemplary Apparatus

Figure 10:
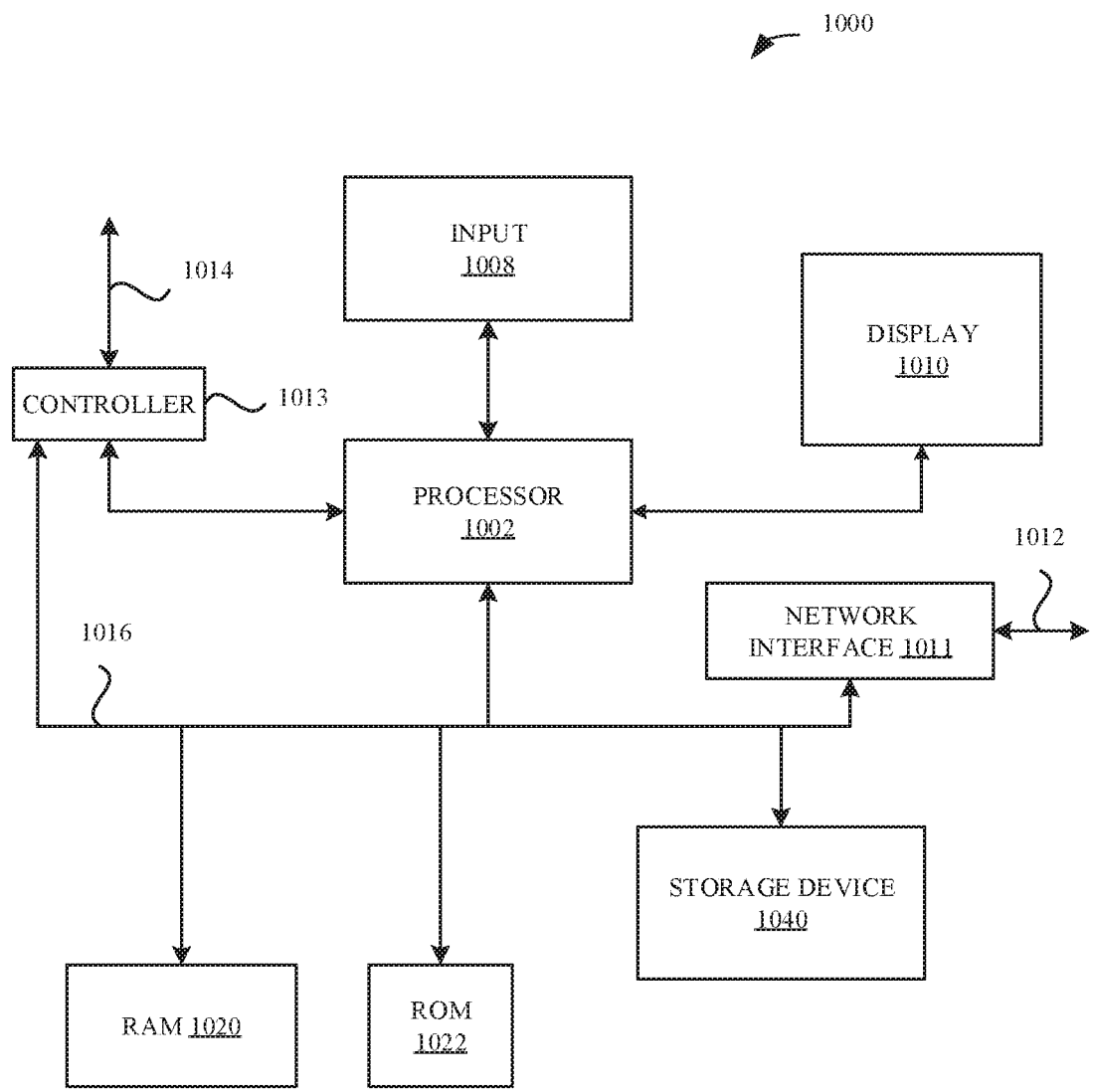
FIG. 10 illustrates an exemplary apparatus for implementation of the embodiments disclosed herein.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the STA 102, STA 130, and AP 110 illustrated in FIG. 1 and succeeding figures. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for communicating buffer status, the method performed by a wireless local area network station (STA) comprising a first buffer and a second buffer, the method comprising:
    receiving a trigger frame from an access point (AP); and
    responsive to receipt of the trigger frame:
        forming a frame body of a medium access control (MAC) frame, the frame body comprising a first data portion of buffered uplink data from the first buffer, wherein the first data portion of buffered uplink data is associated with a first traffic identifier;
        forming a MAC header of the MAC frame, wherein the MAC header comprises a buffer status report for a second data portion of buffered uplink data in the second buffer, and wherein the second data portion of buffered uplink data is associated with a second traffic identifier, different from the first traffic identifier; and
        transmitting the MAC frame to the AP.

2. The method of claim 1, further comprising:
    receiving from the AP a second trigger frame indicating the second traffic identifier; and
    responsive to receipt of the second trigger frame:
        forming a second MAC frame having a second frame body comprising at least a part of the second data portion of buffered uplink data from the second buffer; and
        transmitting the second MAC frame to the AP.

3. The method of claim 1, wherein:
    the first traffic identifier represents a first traffic category (TC) associated with a first user priority (UP), and
    the second traffic identifier represents a second TC associated with a second UP.

4. The method of claim 1, wherein:
    the first traffic identifier represents a first traffic stream (TS), and
    the second traffic identifier represents a second TS.

5. The method of claim 1, wherein the first data portion of buffered uplink data from the first buffer comprises voice application data.

6. The method of claim 5, wherein the second data portion of buffered uplink data in the second buffer comprises video application data.

7. The method of claim 1, wherein the buffer status report includes a traffic identifier (TID) value and a queue information value.

8. The method of claim 7, wherein the queue information value corresponds to units of 256 octets stored in the second buffer.

9. A wireless local area network station (STA) comprising:
    a memory; and
    a processor, wherein the memory comprises instructions that when executed by the processor cause the STA to:
        receive a trigger frame from an access point (AP), and
        responsive to receipt of the trigger frame:
            form a frame body of a medium access control (MAC) frame, the frame body comprising a first data portion of buffered uplink data from a first buffer of the memory, wherein the first data portion of buffered uplink data is associated with a first traffic identifier,
            form a MAC header of the MAC frame, wherein the MAC header comprises a buffer status report based at least in part on the first buffer associated with the first traffic identifier and on one or more other buffers of the memory, wherein at least one buffer of the one or more other buffers is associated with a second traffic identifier different from the first traffic identifier, and transmit the MAC frame to the AP.

10. The STA of claim 9, wherein the buffer status report comprises an aggregated buffer status, the second traffic identifier different than the first traffic identifier, and queue information corresponding to the second traffic identifier.

11. The STA of claim 9, wherein the buffer status report comprises an aggregated buffer status, wherein the aggregated buffer status is based on a first amount of data in the first buffer and a second amount of data stored in at least one of the one or more other buffers.

12. The STA of claim 11, wherein the aggregated buffer status provides an indication of data buffered in at least three data buffers associated with the STA.

13. A non-transitory computer readable medium comprising instructions that when executed by a processor in a wireless local area network station (STA) cause the STA to:

receive a trigger frame from an access point (AP); and responsive to receipt of the trigger frame:

form a frame body of a medium access control (MAC) frame, the frame body comprising a first data portion of buffered uplink data from a first memory buffer, wherein the first data portion of buffered uplink data is associated with a first traffic identifier;

form a MAC header of the MAC frame, wherein the MAC header comprises a buffer status report for a second data portion of buffered uplink data in a second memory buffer, and wherein the second data portion of buffered uplink data is associated with a second traffic identifier different than the first traffic identifier; and transmit the MAC frame to the AP.

14. The non-transitory computer readable medium of claim 13, wherein the instructions further cause the STA to:

receive from the AP a second trigger frame indicating the second traffic identifier; and responsive to receipt of the second trigger frame:

form a second MAC frame having a second frame body comprising at least a part of the second data portion of buffered uplink data from the second memory buffer; and transmit the second MAC frame to the AP.

15. The non-transitory computer readable medium of claim 13, wherein:

the first traffic identifier represents a first traffic category (TC) associated with a first user priority (UP), and the second traffic identifier represents a second TC associated with a second UP.

16. The non-transitory computer readable medium of claim 13, wherein:

the first traffic identifier represents a first traffic stream (TS), and the second traffic identifier represents a second TS.

17. The non-transitory computer readable medium of claim 13, wherein the first data portion of buffered uplink data from the first memory buffer comprises voice application data.

18. The non-transitory computer readable medium of claim 17, wherein the second data portion of buffered uplink data from the second memory buffer comprises video application data.

19. The non-transitory computer readable medium of claim 13, wherein the buffer status report includes a traffic identifier (TID) value and a queue information value.

20. The non-transitory computer readable medium of claim 19, wherein the queue information value corresponds to units of 256 octets stored in the second memory buffer.

* * * * *